United States Patent Office 3,471,008
Patented Oct. 7, 1969

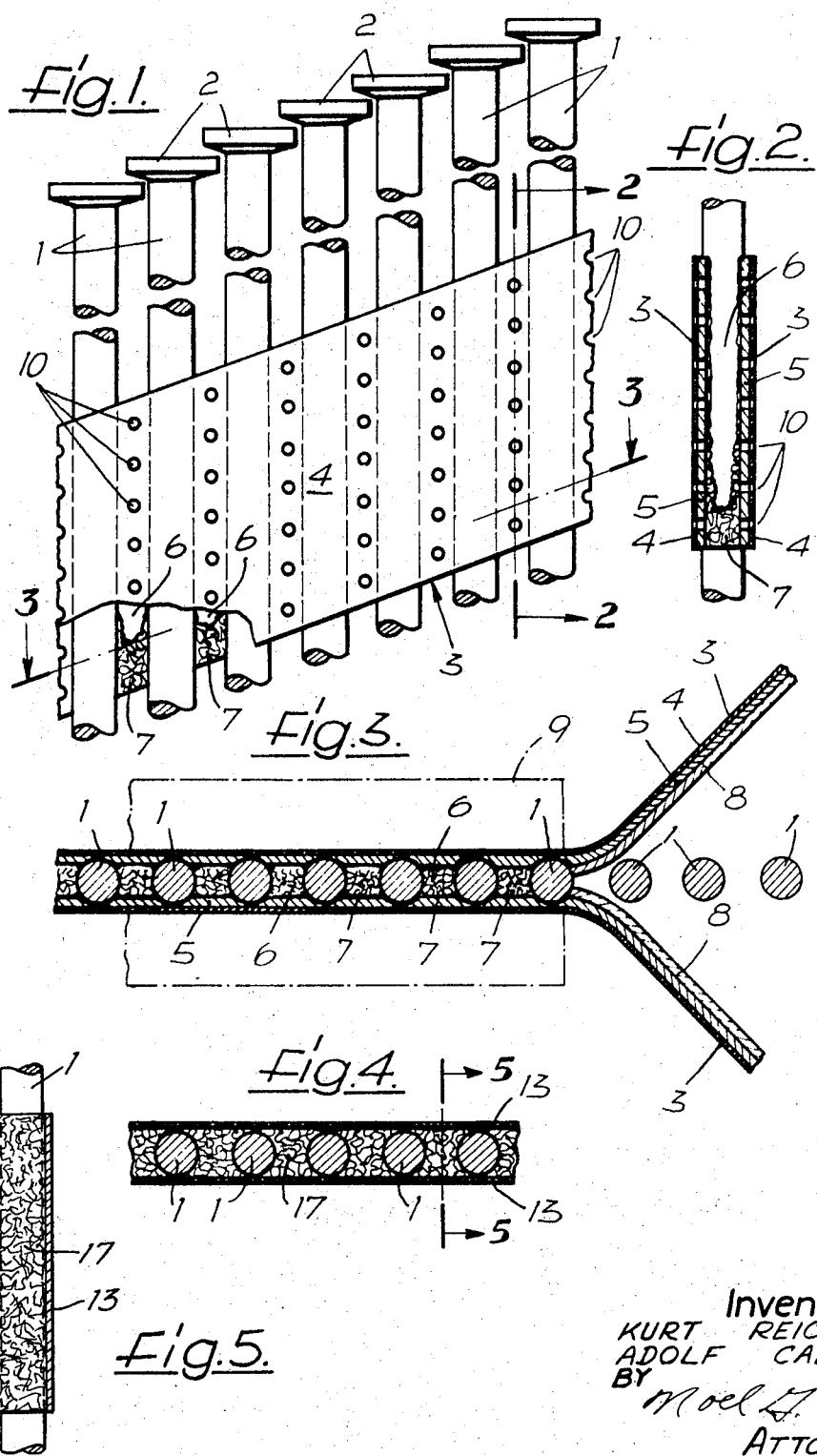

3,471,008
NAIL STRIP AND METHOD OF MAKING
THE SAME
Kurt Reich, Nurtingen, Baden-Wurttemberg, and Adolf
Cast, Oberlenningen, Baden-Wurttemberg, Germany,
assignors to Karl M. Reich Maschinenfabrik, Nurtingen, Germany
Filed June 7, 1967, Ser. No. 643,783
Claims priority, application Germany, Feb. 15, 1967,
R 45,281
Int. Cl. B65d 83/00, 85/24
U.S. Cl. 206—56          16 Claims

ABSTRACT OF THE DISCLOSURE

The present invention includes a strip of full headed nails having their shanks in parallel spaced relation with means for joining the nails into a strip and holding the shanks in parallel spaced relation including one or more webs, each of which extends across a side of the line of nail shanks and has an adhesive and foamy material on the web which extends into the space between adjacent pairs of nail shanks to secure the web to the nail shanks and give the resulting nail strip rigidity, which nail strip is produced by a method wherein full headed nails are aligned with their shanks in adjacent parallel relation and a web, with material which foams when subjected to heat, is extended across one or opposite sides of the line of nail shanks in the strip and the nail strip is subjected to heat to cause the foaming material to foam and fill a substantial portion of the space between adjacent pairs of nail shanks which portion is preferably in the area of the webs furthest away from the nail heads.

---

The present invention relates to strips of nails held by their shanks in adjacent parallel relation by destructible means; and more particularly to the product and method of making such nail strips wherein said nail shanks are held in said adjacent parallel relation by web means extending along one, or both, sides of the line of nail shanks with a hard cellular filler material between adjacent shanks and the web means.

An important use for nail strips of the present invention and made by a method of the present invention is in powered nailing machines wherein a strip of nails, with their shanks held in parallel relation and their heads in stepped relation, are placed in a magazine of the nailing machine and the nails are urged toward the barrel of the nailing machine by nail follower—normally driven by a spring. A driver blade, or pin, in the nailing machine will drive the nails sequentially with the nail follower urging a new nail into operative position each time the nail-driving blade, or pin, is withdrawn after a nail-driving operation.

There are several important requirements of the nail strips which are used in such magazine nailing machines. Firstly, the means used to form the nails into a strip must give the strip sufficient rigidity that the nails may be easily handled and placed in the magazine. Further, the joining means must have sufficient rigidity to hold the nail shanks in parallel spaced relation even after insertion in the nailing machine magazine. This last requirement is made more rigorous by the following facts. In the field the workman will take several nail strips from the shipping box and put them in a pouch on his belt to carry them as he successively puts them in the nailing machine magazine. When the nail strips are placed in the pouch and when they are carried in the pouch, the points of the nails oftentimes receive forces which tend to jam them together. Additionally, for loading purposes, the workman will move the nail follower back to a retracted position in the magazine and secure the follower on a provided stop. Then, after the workman places a strip of nails in the magazine, he often merely disengages the nail follower from its stop—allowing the spring to snap the follower forward against the end nail of the strip of nails.

On the other hand, the requirement for rigidity cannot be solved by merely using large amounts of joinder material. For structural reasons, the barrel where the nail-driving pin, or blade, is located is a fairly closed area. Accordingly, it is important that the material which is used to join the nails into a strip be such that it will be ejected from the rather closed area of the barrel of the nail-driving machine and will not clog or jam the area. Also, the material used to hold the nails in a strip must be such as to minimize the amount of material which falls onto the workpieces after ejection from the nailing machine. Such material may prevent proper joining of two pieces of work material, and at least, substantial amounts of such nail strip material will waste the operator's time involved in keeping the work area clear.

Further, nail strips used with magazine nails are consumed in large quantities. Accordingly, there is the practical requirement that the nail strips must be produced by a method which results in a low cost.

In addition, there is the requirement that the means used to hold the nails in a strip should adhere to the strip sufficiently to permit fairly rugged handling of the nail strips, and yet, said material must not adhere to the nail shanks so securely that the material will end up under the head of the nail when the latter is driven.

With the foregoing in mind, it is a major object of this invention to provide an improved nail strip wherein the shanks of the nails are held in parallel spaced relation by low cost, destructible means which is readily ejected from a nailing machine as each nail is driven from the strip.

Another object of this invention is to provide a new nail strip when the nails are held in spaced relation by improved means including a foamy material filling at least part of the space between adjacent nail shanks.

Still another object of this invention is to provide an improved nail strip wherein the means holding the nails in the strip are such as to produce a strong nail strip with less joinder material to thereby minimize the problems of ejecting from the nailing machine the joinder material and reduce costs.

It is a still further object of this invention to provide a new nail strip wherein the nail shanks are held in spaced apart relation by means which tends to fragment when each nail is driven to reduce clogging of the nailing machine and to reduce the chances of material sticking below the head of the nail when it is driven.

It is still another object of this invention to provide an improved nail strip wherein the nail shanks are securely held in spaced relation by low cost means.

It is a further object of this invention to provide a nail strip having a foamy central filler between spaced nail shanks, which filler material is not substantially effected by heat of the temperatures which would effect a thermo plastic coating on a web extending across a side of a line of nail shanks.

Still another object of this invention is to provide a new nail strip having nails held with their shanks in spaced parallel relation by joinder means which is weakened along a line between each pair of adjacent nail shanks to facilitate separation of the joinder material along a line between a nail being driven and the nail adjacent it in the strip.

A further object of this invention is to provide a new method of making nail strips wherein, after the nails are aligned, a web of material is extended across one, or both sides, of the line of nail shanks and there is formed in the space between adjacent nail shanks a rigid cellular or foamy material which adds to the rigidity of the strip.

It is a still further object of this invention to provide an improved method for making nail strips using low cost foam producing material on webs which are extended across the side of a line of nail shanks and the resultant rigid foam material reduces the requirement for more expensive adhesives or thermo plastic coatings on the web.

A still further object of this invention is to provide a new method of making nail strips having spaced nail shanks wherein the nail strip is produced by forming a belt consisting of two outer webs with a layer of hard foam plastic between these webs, and then the nails are inserted through the foam plastic in proper relation to be held by the foam plastic.

Another object of this invention is to provide a method of producing nail strips wherein a liquid material including solvent and filler material is placed on two webs and the webs are extended across the sides of a line of nail shanks with the liquid material extending between the nail shanks and then evaporating the solvent to leave a hard foam structure which fills at least part of the spaces between the nail shanks and the webs to help rigidify the nail strip.

Other and further objects of this invention will become apparent in the detailed description below in connection with the attached drawings wherein:

FIGURE 1 is a fragmentary side view of a first embodiment of a nail strip according to the present invention;

FIGURE 2 is a cross section view of the nail strip shown in FIGURE 1 taken along line 2—2 of FIGURE 1;

FIGURE 3 is a cross sectional view taken along line 3—3 of FIGURE 1 with certain additions to diagrammatically illustrate a method of producing the nail strip of FIGURE 1;

FIGURE 4 is a cross sectional view of another embodiment of the present invention as seen in the same aspect as FIGURE 3; and, FIGURE 5 is a fragmentary cross sectional view taken along line 5—5 in FIGURE 4 depicting the nail strip of FIGURE 4 as seen in a plane parallel to the axis of the nails.

Referring now to FIGURE 1, there is shown a first embodiment of the invention. As can be seen, the nail strip comprises a plurality of nails 1 which are aligned adjacent to each other in a row or line. Each of the nails 1 has a full head 2 at its upper end extending laterally. For purposes of conserving space, the adjacent nails 1 are offset axially so that the nail head 2 of each successive nail overlaps the next adjacent nail head resulting in the stepped configuration shown in FIGURE 1.

Preferably, there is a pair of webs 3 which extend across opposite sides of the line of nail shanks, which webs are designed to be destructible in order to permit the nails to be sequentially driven by the nailing machine from the nail strip. In the preferred form, each of the webs 3 consists of an outer layer of paper 4 with an inner layer of thermoplastic material 5, such as a heat responsive adhesive, which engages and receives into it the sides of the nail shanks.

Because of the full heads 2 of the nails 1, the shanks of the nails must be spaced from each other in order to be in parallel relation. Therefore, each pair of adjacent nail shanks defines a space 6 which is additionally enclosed by the webs 3 on either side of the nail shanks.

As mentioned above, a major requirement for nail strips is that they successfully resist forces which tend to jam the nails (and particularly the points thereof) together. The thermo plastic material 5 will give a certain amount of rigidity to the nail strip. However, it has been found that the rigidity of the nail strip can be substantially increased by the provision of a foamy material filling at least part of the space between the shanks and the webs. In FIGURES 1 and 2 particularly, it can be seen how hard foamy material 7 is positioned between the nail shanks and the webs 3. By way of example, the foamy material 7 might be residue of evaporated adhesive varnish, in which case a nitrocellulose lacquer is preferred. Alternatively, some other foam material might be used.

As can be seen, the resulting joinder material structure in the area of the foamy material 7 is very similar to sandwich structure in the aircraft industry where the maximum strength and rigidity with a minimum of weight is acquired by having two spaced face sheets (webs 3) with a lightweight core material (foamy material 7) therebetween.

The resulting hard foamy material has the advantage that the many thin walled cells of the foamy material present a very rigid structure capable of taking substantial amounts of crushing forces and well adapted to rigidify the webs with a minimum amount of material. Naturally, the rigidity of the foamy material permits the layer of thermo plastic material 5 to be thinner. The hard foamy material has the additional advantage that, when the nailing machine driver blade strikes the head of the end nail of a nail strip to drive said nail, the foamy material readily fragments into very small pieces which do not tend to clog the machine or stick to the shank and be caught below the head of a driven nail. Also, after manufacture, the foamy material 7 is considerably less sensitive to heat than the plastic 5. Therefore, if the nail strip were, e.g., left in the sun, the foamy material would support the nail strip even though the plastic 5 would become somewhat soft.

It is particularly important to note that in the embodiment shown in FIGURES 1 and 2, the bulk of the foamy filler material 7 is located at the edge of the webs 3 furthest away from the nail heads 2. Such configuration is desired to reduce the amount of joinder material necessary to assure that the nail shanks will not be jammed together. This fact can be seen by the following examples. Assuming that there was applied to the points of two adjacent nails forces tending to push them together, the effectiveness of the foam material 7 to prevent jamming of the nail tips may be increased by placing the material closer to the point of application of the forces, i.e., closer to the nail points, and the effectiveness would be reduced by moving the material away from the point of application of the forces, i.e., moving the material toward the nail heads 2. Also, if the jamming forces were applied to two adjacent nail shanks at a point between the nail heads 2 and the filler material 7, the loads on the filler material are directly proportional to the distance from the point of application of the load to the nail head 2 over the distance from the point of application of the load to the foam material 7. Since the nail heads 2 easily prevent the upper end of the nails 1 from being jammed together, the only real concern is the crushing of the webs 3 and the foamy material 7.

In order to economically produce this advantageous structure shown in FIGURES 1 and 3, a method is used of which the following is a preferred form. The nails 1 are aligned on an inclined track with the heads 2 in stepped relation in a conventional manner. Then the webs 3 are fed to a position adjacent the line of aligned nails at which point a layer 8 of foam producing material is applied to the webs 3 in a liquid form. At that point, the webs 3 may either be horibontal or vertical; however, the webs are then oriented to a vertical position (such as shown in FIGURE 2) whereby, as the webs are extended across opposite sides of the line of nail shanks, gravity causes the liquid foam producing material of layer 8 to settle toward the preferred position along the bottom edges of the webs 3.

As indicated diagrammatically in FIGURE 3, the nails 1 are aligned and are moving down an inclined track to a point here the webs 3, having the layer 8 of foam producing material thereon, are fed onto the passing row, or line, of aligned nails. From that point, the line of nails passes into a pressure and heating apparatus 9 (schematically indicated by a center line), in which apparatus the nails 1 are embedded in the thermoplastic material 5 and the layer 8 of foam producing material produces the foam material 7.

If the layer 8 is a cheap material such as adhesive varnish, the foam material 7 is produced by evaporating the solvent out of the varnish as mentioned above. Alternatively, the layer 8 may be of a plastic of, for example, a styrene base, which will foam when subjected to the heat of the apparatus 9. Alternatively, the hard foamy material 7 could be produced by pure catalytic reaction by proper selection of the materials. In this last case, the foamy plastic could be inserted in between the webs 3 after the nails 1 have passed through the compression and heating apparatus 9, however, it is easier to apply the plastic before the application of the webs to the nails.

It is preferred that the thermoplastic material 5 be used in order to secure the adhesive characteristics. However, if the foamy material layer 8 has sufficient adhesive qualities, there need not be used the material 5 since the varnish is coated over the entire area of the webs 3. As illustrated in FIGURE 2, although most of the varnish has settled to the bottom of the edge of the webs, there is varnish all the way up to the top edge of the webs.

It should also be noted in FIGURES 1 and 2 that the webs are preferably provided with perforations 10 extending from the top edge to the lower edge of the webs in a line coincident with the spaces between adjacent pairs of nail shanks. These perforations—preferably formed after the nails 1 exit the apparatus 9—function to assist in causing a clean tearing of the webs at the position between the adjacent nail shanks when the nail is driven by the nail driver.

In FIGURES 4 and 5, there is shown another embodiment of the subject invention. In this embodiment, there is no thermoplastic layer such as the material 5 and the webs are formed by paper webs 13. The paper webs 13 are held together with the nails 1 by means of a rigid foam plastics 17 which is in the spaces between the nails and the webs. The nail strip disclosed in FIGURES 4 and 5 has plastic material from the top to the bottom of the webs 13 (see FIGURE 5 in particular). However, the foam plastic 17 could be concentrated in the area of the lower edges of the webs 13 as in the case of the nail strip shown in FIGURE 2. Alternatively, the nail strip shown in FIGURE 2 could have the foamy material 7 extend all the way to the top edge of the webs 3 as the plastic 17 extends to the top edge of the webs 13.

The nail strip disclosed in FIGURES 4 and 5 may be produced by a method similar to the method described with reference to FIGURE 3 by positioning the nails on an inclined track down which the nails move with their heads in stepped relation. The nails then move past a point where the paper webs 13 are applied to the sides of the line of nail shanks moving past that point—the webs 13 having been previously coated on the side facing the nails with a foam plastic in an unexpanded condition. Then, by the application of heat and pressure, this material is expanded as it passes through apparatus like apparatus 9, and set so as to form a brittle foam plastic having adhesive qualities to hold the nails 1 and the paper webs 13 together.

The nail strip disclosed in FIGURES 4 and 5 may also be produced by first forming a belt consisting of a layer of the foam plastic 17 with a web 13 on either side. Then, the nails 1 are positioned into the joinder material by simply forcing the nails through the brittle foam plastic 17 in parallel spaced relation. Although the foam plastic 17 is hard and bittle, the wall of each cell of the foam material is thin enough that the nails may be easily pushed through the plastic.

Naturally, the webs 13 could be provided with perforations such as the perforations 10 in the first embodiment.

While only a few embodiments of the present invention have been shown and described in detail it will be apparent to those skilled in the art that such is by way of illustration only and numerous changes can be made thereto without departing from the spirit of the present invention. For example, although provision of one web on each side of the nail shanks is preferred, on web on one side will accomplish the desired results if the foamy material has sufficient adhesive and strength qualities.

We claim:
1. A nail strip comprising:
   a plurality of nails each having a head adjacent the head of a nail next to it and having a shank extending from said head generally parallel to and spaced from the shank of the nail next to it with each pair of nail shanks, said strip of nails extending in a line;
   a first web of material extending across said shanks on one side of said line of said nails;
   a hard foamy material filling at least part of the space between each pair of adjacent nail shanks and engaging said adjacent shanks and said web where it extends adjacent the space between each pair of adjacent nail shanks, whereby said hard foamy material gives support to help prevent adjacent shanks from being pushed together.

2. The nail strip forth in claim 1 wherein said hard foamy material has an adhesive characteristic and adheres to the shanks of said nails where said hard foamy material contacts said nail shanks.

3. The nail strip set forth in claim 1 wherein said hard foamy material is a cellular residue of a liquid from which the solvent has been evaporated.

4. The nail strip set forth in claim 1 wherein said foamy material is a heat responsive material which foams upon application of heat to it.

5. The nail strip set forth in claim 1 including: a second web extending across the sides of said nail shanks on the opposite side of said shanks from said first web of material.

6. The nail strip set forth in claim 5 including: a hard foamy material adhered to said second web and extending into the space between adjacent pairs of nail shanks in said strip.

7. The nail strip set forth in claim 6 wherein: each web of material has a predetermined width and has a first edge nearer the heads of the nails and a second edge further away from the heads of the nails, and said hard foamy material fills more the space between the shanks in the area near the second edge of said web than in the space between adjacent nail shanks in the area of the first edge of said webs.

8. The nail strip set forth in claim 7 wherein: said foamy material is a cellular residue of a liquid from which the solvent has been evaporated.

9. The nail strip set forth in claim 1 wherein said web has a predetermined width extending from a first edge nearer the heads of the nails and a second edge further away from the heads of the nails and including:
   means on said web in the area between each adjacent pair of nail shanks extending from said first edge to said second edge for weakening the web in such area.

10. The nail strip set forth in claim 1 including: a film of adhesive material on said web engaging and adhering to said nail shanks.

11. The nail strip set forth in claim 10 wherein: said adhesive material is a heat responsive material which becomes more adhesive when subjected to heat and said foamy material is a heat responsive material which foams when subjected to heat, whereby said foamy material will expand between adjacent pairs of nail shanks at the same time said adhesive material is subjected to heat.

12. A method of producing a strip of nails each having a head and a shank extending from said head, said method comprising:

aligning the nails in a line with the heads adjacent each other and the nail shanks extending generally parallel each other and the nail shanks in a spaced relation forming a space between each pair of adjacent each nail shanks;

applying a film of unexpected plastic materal to a web, said plastic material having the characteristic of becoming brittle when expanded;

extending the web across the shanks of said line of nails with said plastic film contacting said nail shanks;

and causing said film of plastic material to expand between the spaces between pairs of adjacent nail shanks to give support to help prevent the nail shanks from being pushed together.

13. The method set forth in claim 12 wherein: said plastic material expands when subjected to heat and heat is applied to said foam when in engagement with said nail shanks to cause said material to expand and extend into the spaces between adjacent pairs of nail shanks.

14. The method set forth in claim 12 wherein said nails are aligned with the nail shanks depending, said web has a predetermined width and is applied to the sides of the nail shanks with said width extending in a vertical direction, and said film of plastic material is applied in a fluid form which flows toward the bottom edge of said web, whereby there is more plastic material on the bottom part of the web than the top part of the web and there is more material expanded into the space between pairs of adjacent nail shanks in the area near the bottom edge of the web than in the area near the top edge of the web which is closer to the nail heads.

15. A method of producing a strip of nails each having a head and a shank extending from said head, said method comprising:

aligning a plurality of nails in a line with the heads adjacent to each other and the nail shanks depending downwardly with the nail shanks extending generally parallel to each other in spaced relation forming a space between each pair of adjacent nail shanks;

applying a film of fluid material to a web, said fluid material having solids which are suspended in a solvent;

extending the web across the shanks of said aligned nails with said fluid contacting said nail shanks;

and evaporating said solvent from said fluid to leave a cellular residue in the space between each pair of adjacent nail shanks.

16. The method of producing a strip of nails set forth in claim 15 wherein:

said web has a predetermined width with a first edge closer to the heads of said nails and a second edge further away from said heads of said nails;

and said film of fluid material is applied in a ribbon closer to said second edge than said first edge.

References Cited

UNITED STATES PATENTS

| | | | |
|---|---|---|---|
| 2,379,934 | 7/1945 | Seiferth | 206—56 |
| 2,798,594 | 7/1957 | Dillon | 206—16 |
| 3,212,632 | 10/1965 | Baum et al. | 206—56 |
| 3,006,780 | 10/1961 | Shaffer | 206—59 |
| 3,232,424 | 2/1966 | Stein et al. | 206—65 |
| 3,276,576 | 10/1966 | Langas et al. | 206—56 |
| 3,349,899 | 10/1967 | Powers | 206—56 |

WILLIAM T. DIXSON, Jr., Primary Examiner

U.S. Cl. X.R.

264—47

PO-1050
(5/69)

UNITED STATES PATENT OFFICE
CERTIFICATE OF CORRECTION

Patent No. 3,471,008          Dated October 7, 1969

Inventor(s) Kurt Reich and Adolf Cast

It is certified that error appears in the above-identified patent and that said Letters Patent are hereby corrected as shown below:

Column 4, line 72 after "be" change "horibontal" to --horizontal--.
Column 6, line 14 remove the word "on" the second time it appears and insert --one--;
           line 33 after "strip" insert --set--.
Column 7, line 9 after "allel" insert --to--;
           line 9 remove "and" and insert --with--.
           line 12 remove "unexpected" and insert --unexpanded--.

SIGNED AND
SEALED
MAY 26 1970

(SEAL)
Attest:

Edward M. Fletcher, Jr.
Attesting Officer

WILLIAM E. SCHUYLER, JR.
Commissioner of Patents